US012763988B2

(12) United States Patent
Liu et al.

(10) Patent No.: US 12,763,988 B2
(45) Date of Patent: Oct. 13, 2026

(54) SINGLE-WIRE MULTI-DEVICE CASCADE ADDRESSING SYSTEM

(71) Applicant: ANPEC ELECTRONICS CORPORATION, Hsinchu (TW)

(72) Inventors: Yun-Li Liu, Hsinchu (TW); Ruei-Hung Chiou, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 18/476,325

(22) Filed: Sep. 28, 2023

(65) Prior Publication Data

US 2025/0007750 A1 Jan. 2, 2025

(30) Foreign Application Priority Data

Jun. 29, 2023 (TW) ................................ 112124193

(51) Int. Cl.
*H04L 12/40* (2006.01)
*H04L 61/5038* (2022.01)

(52) U.S. Cl.
CPC .... *H04L 12/40013* (2013.01); *H04L 61/5038* (2022.05)

(58) Field of Classification Search
CPC ..................... H04L 12/40013; H04L 61/5038
See application file for complete search history.

(56) References Cited

U.S. PATENT DOCUMENTS 8,492,983 B1 7/2013 Berg et al.
9,113,513 B1 * 8/2015 Jungwirth ............. H05B 45/46
10,314,137 B1 * 6/2019 Lai ...................... G05B 19/042
10,353,384 B1 * 7/2019 Tran ...................... G08C 17/02
2007/0280007 A1 * 12/2007 Wallner ................ G11C 7/106
365/189.05
2008/0086590 A1 * 4/2008 Urabe ................ G06F 13/4256
711/E12.008

(Continued)

FOREIGN PATENT DOCUMENTS

CN 101603648 A 12/2009
CN 103139320 A 6/2013

(Continued)

*Primary Examiner* — Abdelbasst Talioua

(74) *Attorney, Agent, or Firm* — Li & Cai Intellectual Property Office

(57) ABSTRACT

A single-wire multi-device cascade addressing system is provided. In the multi-device cascade addressing system, a plurality of devices are arranged sequentially and connected in series with each other, and a first device and a final device among the plurality of devices are connected to a controller. The first device addresses itself according to an addressing command packet having an individual device identification address from the controller and outputs the adjusted addressing command packet to the next device. Each of the plurality of devices except for the first device addresses itself according to the addressing command packet from the previous device. Each of the plurality of devices except for the first and final devices adjusts the addressing command packet from the previous device, and outputs the adjusted addressing command packet to the next device. The final device transmits the addressing command packet from the previous device to the controller.

9 Claims, 9 Drawing Sheets

(56) References Cited

U.S. PATENT DOCUMENTS

| | | | | |
|---|---|---|---|---|
| 2008/0205168 | A1* | 8/2008 | Pyeon | G06F 13/4243<br>711/E12.019 |
| 2009/0079355 | A1* | 3/2009 | Zhou | H05B 45/3725<br>315/246 |
| 2009/0154285 | A1* | 6/2009 | Pyeon | G06F 1/10<br>365/233.1 |
| 2009/0198857 | A1* | 8/2009 | Pyeon | G11C 8/12<br>711/E12.001 |
| 2013/0089157 | A1* | 4/2013 | Chu | H04L 61/5038<br>375/259 |
| 2013/0260500 | A1* | 10/2013 | Anutgan | H10H 20/01<br>438/37 |
| 2014/0042919 | A1* | 2/2014 | Yang | H05B 45/38<br>315/186 |
| 2014/0173322 | A1* | 6/2014 | Pyeon | G06F 1/04<br>713/400 |
| 2014/0268734 | A1* | 9/2014 | Chang | H05B 45/40<br>362/231 |
| 2014/0269480 | A1 | 9/2014 | Han | |
| 2015/0095733 | A1* | 4/2015 | Pyeon | G01R 31/31701<br>714/734 |
| 2016/0065085 | A1* | 3/2016 | Hamamoto | H05B 45/375<br>363/45 |
| 2016/0364354 | A1* | 12/2016 | Lin | G06F 13/4022 |
| 2016/0380836 | A1* | 12/2016 | Thomas | H04B 10/2575<br>398/115 |
| 2019/0034270 | A1* | 1/2019 | Byun | G06F 11/1068 |
| 2019/0342967 | A1* | 11/2019 | Yu | F21K 9/232 |
| 2020/0383191 | A1* | 12/2020 | Chen | G11C 5/04 |
| 2021/0142739 | A1* | 5/2021 | Sun | G09G 3/2014 |
| 2021/0184559 | A1* | 6/2021 | Tsai | H02M 3/158 |
| 2021/0349645 | A1* | 11/2021 | Hung | G06F 3/0604 |
| 2022/0191059 | A1* | 6/2022 | Rennig | H04L 12/40169 |
| 2022/0283725 | A1* | 9/2022 | Kim | G06F 13/1621 |
| 2023/0299999 | A1* | 9/2023 | Rennig | G06F 13/4022<br>710/305 |

FOREIGN PATENT DOCUMENTS

| | | | |
|---|---|---|---|
| CN | 103139920 | A | 6/2013 |
| CN | 106302072 | A | 1/2017 |

* cited by examiner

| | Preamble | | Start | Register Address | | | | | | | R/W | Device Identification Address | | | | | | | | End |
|---|---|---|---|---|---|---|---|---|---|---|---|---|---|---|---|---|---|---|---|---|
| Bit | b19 | b18 | b17 | b16 | b15 | b14 | b13 | b12 | b11 | b10 | b9 | b8 | b7 | b6 | b5 | b4 | b3 | b2 | b1 | b0 |
| Bit Value | 1 | 0 | 1 | 1 | 1 | 1 | 1 | 1 | 1 | 1 | 1 | 01 | | | | | | | | 0 |

FIG. 8

SINGLE-WIRE MULTI-DEVICE CASCADE ADDRESSING SYSTEM

CROSS-REFERENCE TO RELATED PATENT APPLICATION

This application claims the benefit of priority to Taiwan Patent Application No. 112124193, filed on Jun. 29, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a multi-device cascade system, and more particularly to a single-wire multi-device cascade addressing system.

BACKGROUND OF THE DISCLOSURE

In a conventional multi-device cascade addressing system, a plurality of devices are arranged sequentially and connected in series with each other. A controller of the conventional multi-device cascade addressing system must be connected to the plurality of devices through a plurality of additional transmission wires for controlling operation time of the plurality of devices, which incurs additional wire costs. In various applications of the plurality of devices, such as a driving application of a plurality of light-emitting diodes (LEDs) included in the plurality of devices, information such as command information and individual device information of each of the plurality of devices are transmitted between the plurality of devices. When the command information is transmitted between the plurality of devices of the conventional multi-device cascade addressing system, each of the plurality of devices must individually transmit the command information once, such that the plurality of devices need to collectively transmit the command information for multiple times, resulting in unnecessary waste of bandwidth.

SUMMARY OF THE DISCLOSURE

In response to the above-referenced technical inadequacies, the present disclosure provides a single-wire multi-device cascade addressing system. The single-wire multi-device cascade addressing system includes a controller and a plurality of devices. The plurality of devices are arranged sequentially. A first one of the plurality of devices is defined as a first device. A last one of the plurality of devices is defined as a final device. An input terminal of the first device is connected to an output terminal of the controller. An input terminal of each of the plurality of devices except for the first device is connected to an output terminal of a previous one of the plurality of devices. An output terminal of the final device is connected to an output terminal of the controller. The input terminal of the first device receives an addressing command packet from the output terminal of the controller. The first device sets a unique identification code of the first device according to an individual device identification address in the addressing command packet from the controller. The first device adjusts the individual device identification address in the addressing command packet from the controller. The first device outputs the addressing command packet that is adjusted to one of the plurality of devices that is arranged next to the first device. The input terminal of each of the plurality of devices except for the first device receives the addressing command packet from the output terminal of a previous one of the plurality of devices. Each of the plurality of devices except for the first device sets the unique identification code thereof according to the individual device identification address in the addressing command packet from the previous one of the plurality of devices. Each of the plurality of devices except for the first device and the final device adjusts the individual device identification address of the addressing command packet from the previous one of the plurality of devices, and outputs the addressing command packet that is adjusted to a next one of the plurality of devices. The final device directly transmits the addressing command packet from the previous one of the plurality of devices to the controller, or adjusts the addressing command packet from the previous one of the plurality of devices and outputs the addressing command packet that is adjusted to the controller.

In one of the possible or preferred embodiments, the controller compares the addressing command packet that is outputted to the first device from the controller with the addressing command packet that is received from the final device by the controller to determine the individual device identification addresses respectively received by the plurality of devices and to determine an arrangement sequence and a number of the plurality of devices.

In one of the possible or preferred embodiments, the output terminal of each of the plurality of devices that is not outputting the addressing command packet to the next one of the plurality of devices or the controller is in an off-state.

In one of the possible or preferred embodiments, after each of the plurality of devices except for the final device adjusts the individual device identification address of the addressing command packet from the previous one of the plurality of devices, the output terminal of each of the plurality of devices except for the final device is switched from the off-state to an on-state and outputs the addressing command packet that is adjusted to the input terminal of the next one of the plurality of devices.

In one of the possible or preferred embodiments, after the final device adjusts the individual device identification address of the addressing command packet, the output terminal of the final device is switched from the off-state to the on-state and outputs the addressing command packet that is adjusted to an input terminal of the controller. The output terminals of the plurality of devices are sequentially switched from the off-state to the on-state. An order of switching the output terminals of the plurality of devices from the off-state to the on-state depends on an arrangement sequence of the plurality of devices.

In one of the possible or preferred embodiments, each of the plurality of devices sets the individual device identification address in the addressing command packet from the previous one of the plurality of devices as the unique identification code thereof.

In one of the possible or preferred embodiments, each of the plurality of devices counts up the individual device identification address in the addressing command packet from the previous one of the plurality of devices to increase the individual device identification address once. Each of the plurality of devices sets the individual device identification address that is increased as the unique identification code thereof.

In one of the possible or preferred embodiments, the addressing command packet received by each of the plurality of devices has N bit values, wherein N is an integer value. M bit values among the N bit values in the addressing command packet received by each of the plurality of devices represent the individual device identification address used for setting the unique identification code of each of the plurality of devices, wherein M is an integer value.

In one of the possible or preferred embodiments, the first device adjusts the M bit values of the addressing command packet from the controller that represent the individual device identification address used for setting the unique identification code of the first device. The first device outputs the addressing command packet that is adjusted to one of the plurality of devices that is arranged next to the first device.

In one of the possible or preferred embodiments, each of the plurality of devices except for the first device and the final device adjusts the M bit values of the addressing command packet from the previous one of the plurality of devices, the M bit values represent the individual device identification address used for setting the unique identification code of each of the plurality of devices. Each of the plurality of devices except for the first device and the final device outputs the addressing command packet having the M bit values that are adjusted to the next one of the plurality of devices. The final device outputs the addressing command packet having the M bit values that are adjusted to the controller.

In one of the possible or preferred embodiments, the first device counts up the M bit values of the addressing command packet from the controller that represent the individual device identification address used for setting the unique identification code of the first device to increase the M bit values once. The first device outputs the addressing command packet having the M bit values that are counted up to one of the plurality of devices that is arranged next to the first device.

In one of the possible or preferred embodiments, each of the plurality of devices except for the first device counts up the M bit values of the addressing command packet from the previous one of the plurality of devices that represent the individual device identification address used for setting the unique identification code of each of the plurality of devices. Each of the plurality of devices except for the first device and the final device outputs the addressing command packet having the M bit values that are counted up to the next one of the plurality of devices. The final device outputs the addressing command packet having the M bit values that are counted up to the controller.

In one of the possible or preferred embodiments, the addressing command packet received by each of the plurality of devices has a pulse width modulation signal. Working periods of some of a plurality of waveforms of the pulse width modulation signal represent M bit values of the individual device identification address, wherein M is an integer value. Each of the M bit values is a bit value of “0” or “1”. The bit value of “0” is represented by the working period of one of the plurality of waveforms of the pulse width modulation signal that is not larger than a first working period. The bit value of “1” is represented by the working period of one of the plurality of waveforms of the pulse width modulation signal that is not smaller than a second working period.

In one of the possible or preferred embodiments, the addressing command packet received by each of the plurality of devices has a pulse width modulation signal. Working periods of some of a plurality of waveforms of the pulse width modulation signal represent M bit values of the individual device identification address, wherein M is an integer value. Each of the M bit values is a bit value of “0” or “1”. The bit value of “0” is represented by the working period of one of the plurality of waveforms of the pulse width modulation signal that falls within a first working period range. The bit value of “1” is represented by the working period of one of the plurality of waveforms of the pulse width modulation signal that falls within a second working period range.

In one of the possible or preferred embodiments, the addressing command packet received by each of the plurality of devices has a pulse width modulation signal. Working periods of some of a plurality of waveforms of the pulse width modulation signal represent M bit values of the individual device identification address, wherein M is an integer value. Each of the M bit values is a bit value of “0” or “1”. The bit value of “0” is represented by the working period of one of the plurality of waveforms of the pulse width modulation signal that is equal to a first working period. The bit value of “1” is represented by the working period of one of the plurality of waveforms of the pulse width modulation signal that is equal to a second working period.

In one of the possible or preferred embodiments, before each of the plurality of devices receives the addressing command packet, the unique identification code of each of the plurality of devices is a default identification code. After each of the plurality of devices receives the addressing command packet, each of the plurality of devices uses the individual device identification address in the addressing command packet to replace the default identification code as the unique identification code of each of the plurality of devices for resetting the unique identification code of each of the plurality of devices.

In one of the possible or preferred embodiments, the addressing command packet received by each of the plurality of devices not only has the individual device identification address, but also has an identification code removing command. When each of the plurality of devices receives the addressing command packet, each of the plurality of devices removes the default identification code according to the identification code removing command from the addressing command packet, and each of the plurality of devices sets the individual device identification address in the addressing command packet as the unique identification code of each of the plurality of devices for resetting the unique identification code of each of the plurality of devices.

In one of the possible or preferred embodiments, the addressing command packet received by each of the plurality of devices has N bit values, wherein N is an integer value. P bit values among the N bit values of the addressing command packet represent the identification code removing command for each of the plurality of devices, wherein P is an integer value.

In one of the possible or preferred embodiments, the addressing command packet has a pulse width modulation signal. Working periods of some of a plurality of waveforms of the pulse width modulation signal represent the P bit values of the individual device identification address. Each of the P bit values is a bit value of "0" or "1". The bit value of "0" is represented by the working period of one of the plurality of waveforms of the pulse width modulation signal that falls within a first working period range. The bit value of "1" is represented by the working period of one of the plurality of waveforms of the pulse width modulation signal that falls within a second working period range.

In one of the possible or preferred embodiments, each of the plurality of devices includes one or more light-emitting components.

As described above, the present disclosure provides the single-wire multi-device cascade addressing system. Only one original data transmission wire but not a plurality of clock signal transmission wires is disposed between the plurality of devices and the controller, thereby saving circuit costs. Under this condition, each of the plurality of devices of the single-wire multi-device cascade addressing system of the present disclosure is still able to be efficiently addressed. After the plurality of devices are addressed, the controller of the single-wire multi-device cascade addressing system of the present disclosure is able to transmit the control command packet for issuing the commands respectively for the plurality of devices, and the plurality of devices operate respectively according to the commands.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 8 is a schematic diagram of a plurality of bit values of an addressing command packet transmitted between the plurality of devices of the single-wire multi-device cascade addressing system according to the embodiment of the present disclosure.

DETAILED DESCRIPTION OF THE EXEMPLARY EMBODIMENTS

Figure 1:
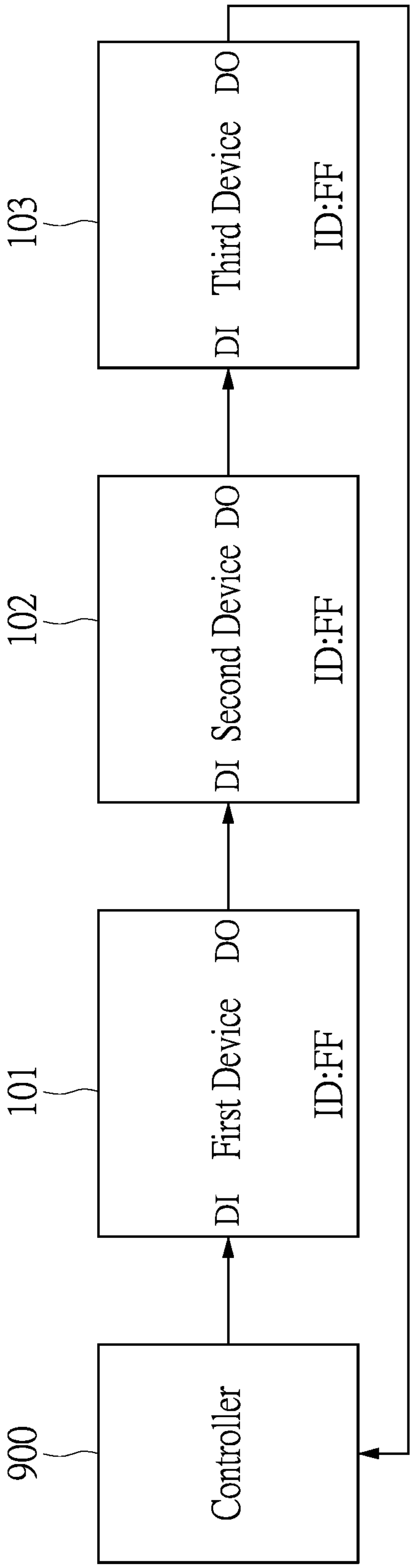
FIG. 1 is a block diagram of a single-wire multi-device cascade addressing system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
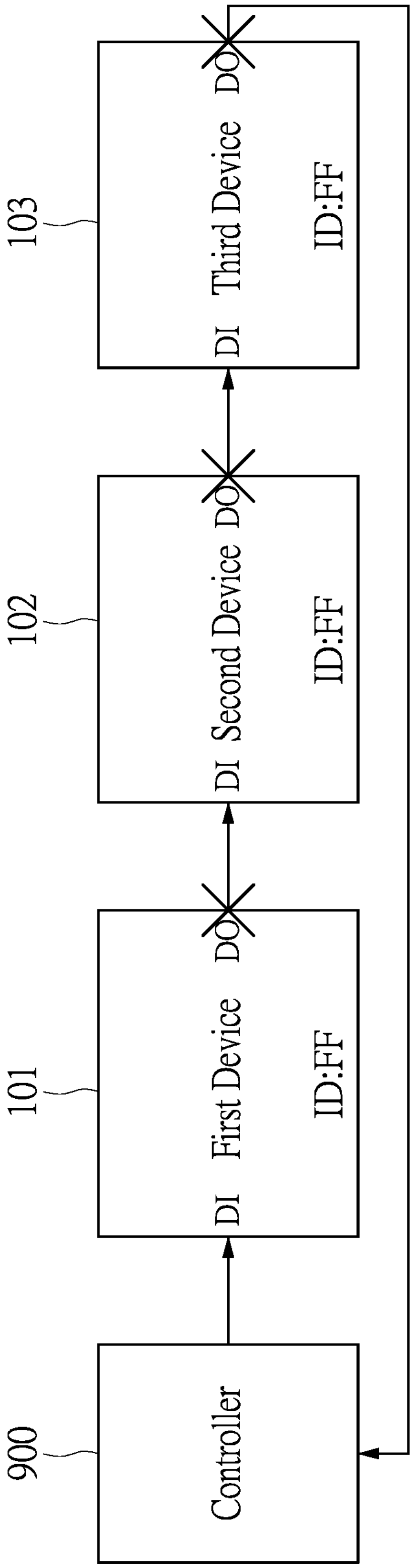
FIG. 2 is a schematic diagram of a plurality of devices that are not addressed in the single-wire multi-device cascade addressing system according to the embodiment of the present disclosure.
Figure 3:
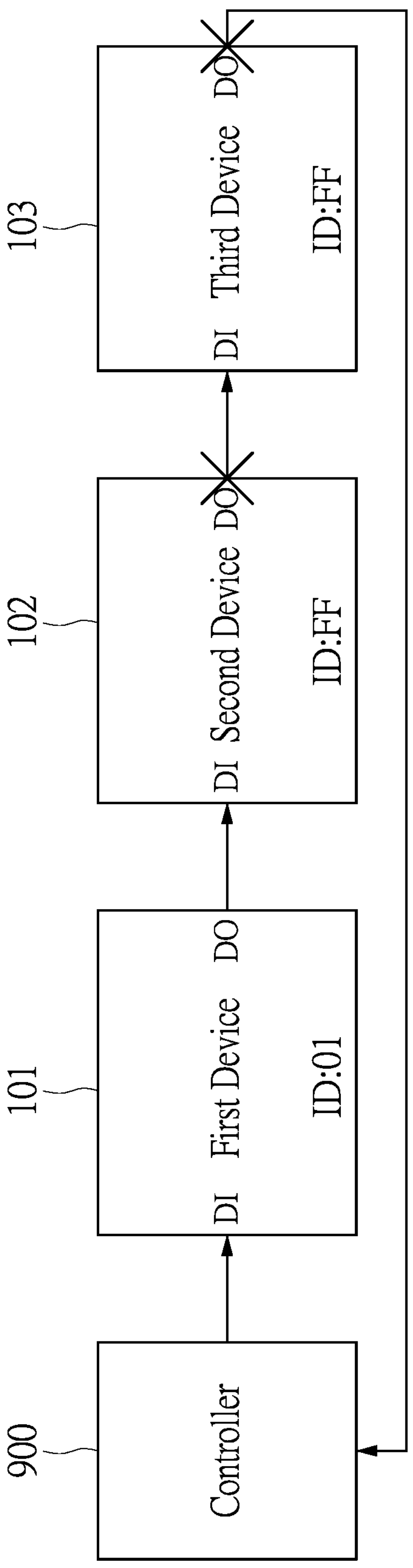
FIG. 3 is a schematic diagram of a first device that is addressed among the plurality of devices of the single-wire multi-device cascade addressing system according to the embodiment of the present disclosure.
Figure 5:
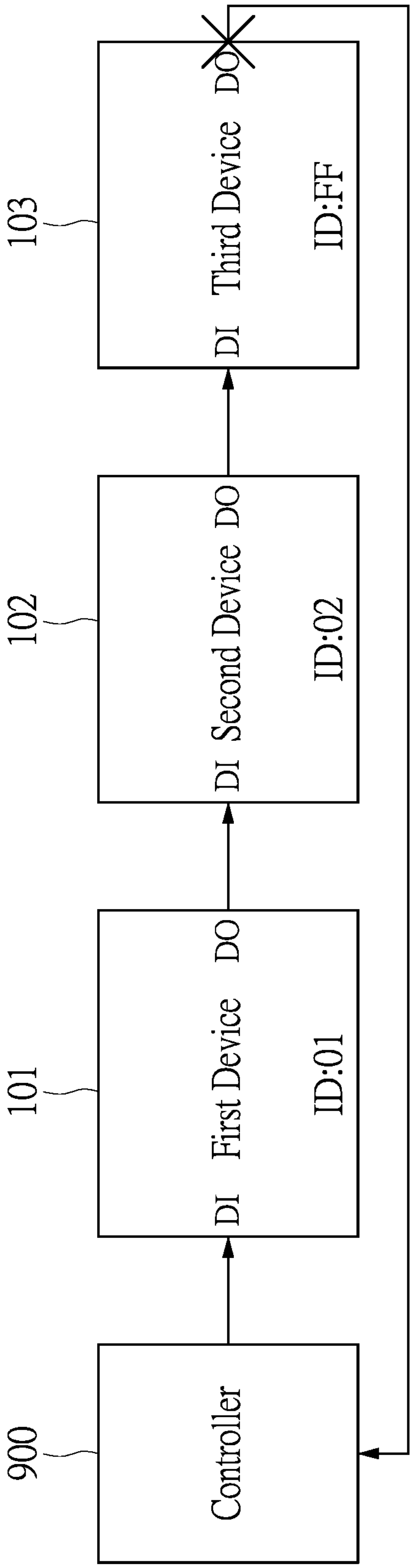
FIG. 5 is a schematic diagram of an addressing command packet generated when the first device and a second device are addressed among the plurality of devices of the single-wire multi-device cascade addressing system according to the embodiment of the present disclosure.
Figure 7:
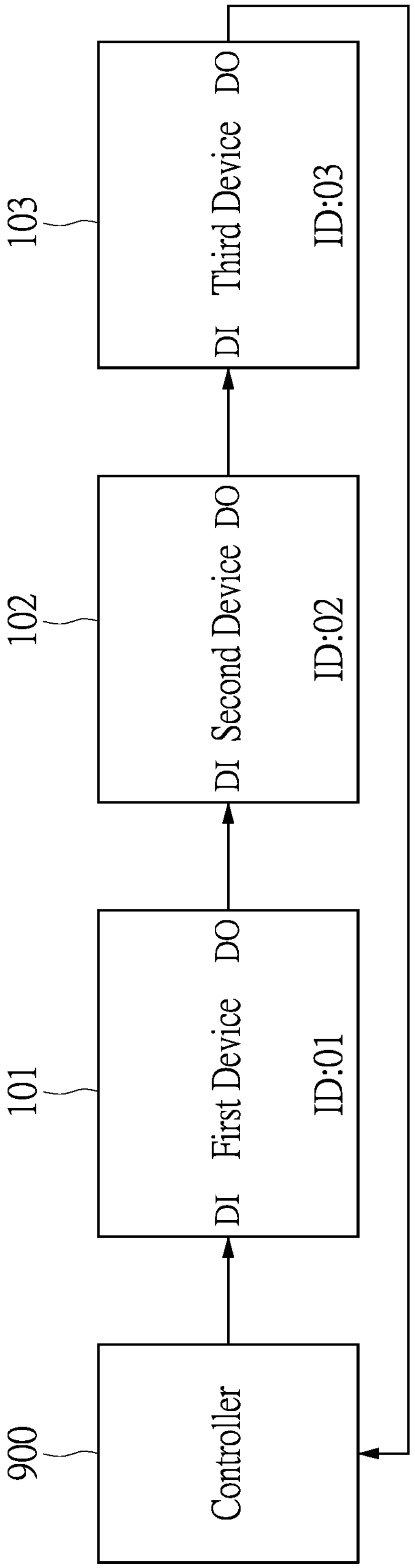
FIG. 7 is a schematic diagram of an addressing command packet generated when all of the plurality of devices are addressed in the single-wire multi-device cascade addressing system according to the embodiment of the present disclosure.

Reference is made to FIGS. 1 to 3, FIG. 5 and FIG. 7, in which FIG. 2 is a schematic diagram of a plurality of devices that are not addressed in the single-wire multi-device cascade addressing system according to the embodiment of the present disclosure, FIG. 3 is a schematic diagram of a first device that is addressed among the plurality of devices of the single-wire multi-device cascade addressing system according to the embodiment of the present disclosure, FIG. 5 is a schematic diagram of an addressing command packet generated when the first device and a second device are addressed among the plurality of devices of the single-wire multi-device cascade addressing system according to the embodiment of the present disclosure, and FIG. 7 is a schematic diagram of an addressing command packet generated when all of the plurality of devices are addressed in the single-wire multi-device cascade addressing system according to the embodiment of the present disclosure.

The single-wire multi-device cascade addressing system of the embodiment of the present disclosure includes a plurality of devices (such as, but not limited to a plurality of devices 101 to 103 as shown in FIG. 1) and a controller 900.

For example, each or any one of the plurality of devices included in the single-wire multi-device cascade addressing system of the embodiment of the present disclosure may be a light-emitting device including one or more light-emitting components such as light-emitting diodes, but the present disclosure is not limited thereto. It should be understood that, the number and types of the plurality of devices included in the single-wire multi-device cascade addressing system, and the number of the light-emitting components in each of the plurality of devices, may depend on actual requirements.

As shown in FIG. 1, the plurality of devices 101 to 103 are sequentially arranged and connected in series with each other. For the convenience of explanation, a first one of the plurality of devices 101 to 103 is defined as a first device 101 and a last one of the plurality of devices 101 to 103 is defined as a final device 103 as described herein.

An input terminal DI of the first device 101 is connected to an output terminal of the controller 900. The input terminal DI of the device 102 is connected to an output terminal DO of the first device 101. The input terminal DI of the final device 103 is connected to the output terminal DO of the device 102. The output terminal DO of the final device 103 is connected to an input terminal of the controller 900.

As shown in FIGS. 1 and 2, the plurality of devices 101 to 103 are not addressed. Under this condition, a unique identification code ID or an individual device identification address of each of the plurality of devices 101 to 103 may be preset to be a default identification code FF. The default identification codes FF respectively of the plurality of devices 101 to 103 may be different from each other.

The output terminal DO of each of the plurality of devices that is not outputting the addressing command packet to a next one of the plurality of devices 101 to 103 or the controller 900 may be in an off-state as shown in FIG. 2.

When the controller 900 intends to address the plurality of devices 101 to 103, the output terminal of the controller 900 outputs the addressing command packet to the input terminal DI of the first device 101.

When the input terminal DI of the first device 101 receives the addressing command packet from the output terminal of the controller 900, the first device 101 sets the unique identification code ID of the first device 101 according to the individual device identification address in the addressing command packet from the controller 900.

In detail, the first device 101 may set the individual device identification address in the addressing command packet from the controller 900 as the unique identification code ID of the first device 101. Alternatively, the first device 101 may count up the individual device identification address in the addressing command packet from the controller 900 to increase the individual device identification address once, and may set the increased individual device identification address as the unique identification code ID of the first device 101.

The first device 101 may adjust the individual device identification address in the addressing command packet from the controller 900. After the first device 101 adjusts the individual device identification address in the addressing command packet from the controller 900, the output terminal DO of the first device 101 is switched from the off-state as shown in FIG. 2 to an on-state as shown in FIG. 3. The output terminal DO of the first device 101 that is in the on-state outputs the adjusted addressing command packet to the input terminal DI of the device 102 that is arranged next to the first device 101.

For example, the first device 101 uses the individual device identification address such as "01" as shown in FIG. 3 in the addressing command packet from the controller 900 to replace the default identification code FF of the first device 101 as shown in FIG. 2 as the unique identification code ID of the first device 101 for resetting the unique identification code ID of the first device 101. In addition, the first device 101 may count up the individual device identification address such as "01" as shown in FIG. 3 in the addressing command packet from the controller 900 once to form the increased individual device identification address such as "02" as shown in FIG. 5. The first device 101 may output the addressing command packet having the increased individual device identification address such as "02" as shown in FIG. 5 to the device 102 that is arranged next to the first device 101.

Alternatively, the first device 101 may count up the individual device identification address such as "00" in the addressing command packet from the controller 900 once to form the increased individual device identification address such as "01", and may set the increased individual device identification address such as "01" as the unique identification code ID of the first device 101. Further, the first device 101 may count up the unique identification code ID of the first device 101 such as "01" once to form the increased unique identification code ID such as "02". The first device 101 may output the addressing command packet having the individual device identification address that is the same as the increased unique identification code ID such as "02" to the device 102 that is arranged next to the first device 101.

When the input terminal DI of the device 102 that is a second one of the plurality of devices 101 to 103 receives the addressing command packet from the output terminal DO of the first device 101, the device 102 sets the unique identification code ID of the device 102 according to the individual device identification address in the addressing command packet from the first device 101.

For example, the device 102 uses the individual device identification address such as "02" as shown in FIG. 5 in the addressing command packet from the first device 101 to replace the default identification code FF of the device 102 as the unique identification code ID of the device 102 for resetting the unique identification code ID of the device 102.

The device 102 may adjust the individual device identification address in the addressing command packet from the first device 101. After the device 102 adjusts the individual device identification address in the addressing command packet from the first device 101, the output terminal DO of the device 102 is switched from the off-state as shown in FIG. 3 to the on-state as shown in FIG. 5. The output terminal DO of the device 102 that is in the on-state outputs the adjusted addressing command packet to the input terminal DI of the final device 103 that is arranged next to the device 102.

For example, the device 102 counts up the unique identification code ID of the device 102 such as "02" to form the increased unique identification code ID such as "03". The device 102 outputs the addressing command packet having the individual device identification address that is the same as the increased unique identification code ID such as "03" to the final device 103 that is arranged next to the device 102.

When the input terminal DI of the final device 103 that is the last one of the plurality of devices 101 to 103 receives the addressing command packet from the output terminal DO of the device 102, the final device 103 sets the unique identification code ID of the final device 103 according to the individual device identification address in the addressing command packet from the device 102.

For example, the final device 103 replaces the default identification code FF of the final device 103 with the individual device identification address such as "03" as shown in FIG. 7 in the addressing command packet from the device 102 as the unique identification code ID of the final device 103 for resetting the unique identification code ID of the final device 103.

After the final device 103 sets the unique identification code ID of the final device 103, the output terminal DO of the final device 103 may be switched from the off-state as shown in FIG. 5 to the on-state as shown in FIG. 7. The output terminal DO of the final device 103 that is in the on-state may directly transmit the addressing command packet from the device 102 to the controller 900. Alternatively, the final device 103 may adjust the addressing command packet from the device 102, and the output terminal DO of the final device 103 that is switched to the on-state from the off-state may output the adjusted addressing command packet to the input terminal of the controller 900.

The output terminals DO of the plurality of devices 101 to 103 may be sequentially switched from the off-state to the on-state. An order of switching the output terminals of the plurality of devices 101 to 103 from the off-state to the on-state may depend on an arrangement sequence of the plurality of devices. Under this condition, an order of addressing the plurality of devices 101 to 103 depends on the arrangement sequence of the plurality of devices.

The controller 900 compares the individual device identification address of the addressing command packet that is outputted to the first device 101 from the controller 900 with the individual device identification address of the addressing command packet that is received from the final device 103 by the controller 900, to determine the individual device identification addresses respectively received by the plurality of devices 101 to 103 and to determine the arrangement sequence and the number of the plurality of devices 101 to 103.

Figure 4:
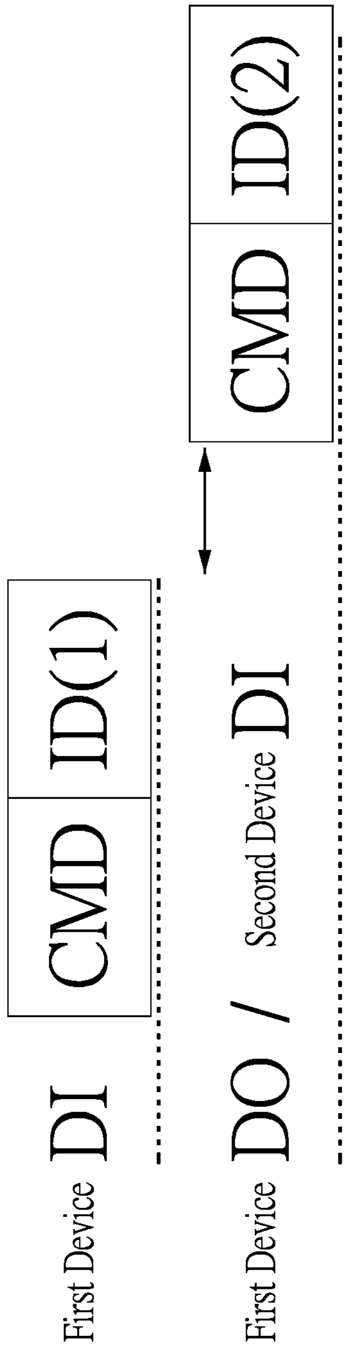
FIG. 4 is a schematic diagram of an addressing command packet generated when the first device is addressed among the plurality of devices of the single-wire multi-device cascade addressing system according to the embodiment of the present disclosure.
Figure 6:
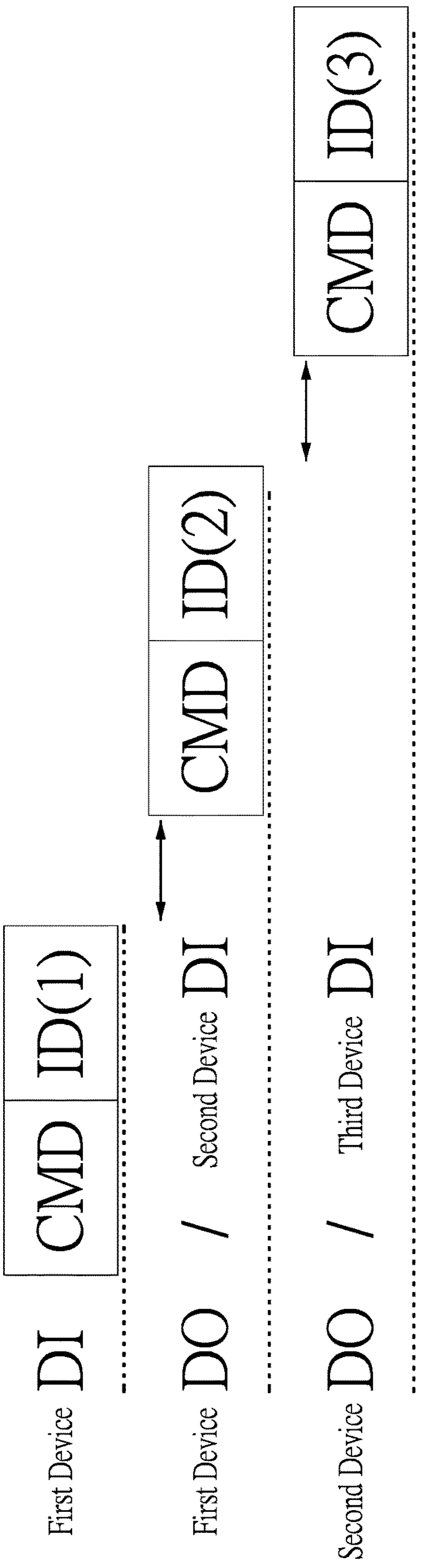
FIG. 6 is a schematic diagram of an addressing command packet generated when the first device and the second device are addressed among the plurality of devices of the single-wire multi-device cascade addressing system according to the embodiment of the present disclosure.

Reference is made to FIGS. 1 to 7, in which FIG. 4 is a schematic diagram of an addressing command packet generated when the first device is addressed among the plurality of devices of the single-wire multi-device cascade addressing system according to the embodiment of the present disclosure, and FIG. 6 is a schematic diagram of an addressing command packet generated when the first device and the second device are addressed among the plurality of devices of the single-wire multi-device cascade addressing system according to the embodiment of the present disclosure.

The addressing command packet that is received from the controller 900 by the input terminal DI of the first device 101 may not only have the individual device identification address of the unique identification code ID (1) of the first device 101, but also have an identification code removing command CMD, as shown in FIG. 4.

When the addressing command packet that is received from the controller 900 by the first device 101 has the identification code removing command CMD, the first device 101 removes the default identification code FF of the first device 101 according to the identification code removing command CMD in the addressing command packet from the controller 900. The first device 101 sets the individual device identification address in the received addressing command packet (or the individual device identification address that is counted up by the first device 101 as described above) as the unique identification code ID (1) of the first device 101. At this time, resetting of the unique identification code ID (1) of the first device 101 is completed.

The addressing command packet that is outputted from the output terminal DO of the first device 101 to the input terminal DI of the device 102 may not only have the individual device identification address representing the unique identification code ID(2) of the device 102, but also have the identification code removing command CMD, as shown in FIG. 4.

When the addressing command packet that is received from the first device 101 by the device 102 has the identification code removing command CMD, the device 102 removes the default identification code FF of the device 102 according to the identification code removing command CMD in the received addressing command packet. The device 102 sets the individual device identification address in the received addressing command packet (or the individual device identification address that is counted up by the first device 101 as described above) as the unique identification code ID (2) of the device 102. At this time, resetting of the unique identification code ID (2) of the device 102 is complete.

The addressing command packet that is outputted from the output terminal DO of the first device 102 to the input terminal DI of the final device 103 may not only have the individual device identification address representing the unique identification code ID(3) of the device 102, but also have the identification code removing command CMD, as shown in FIG. 6.

When the addressing command packet that is received from the device 102 by the final device 103 has the identification code removing command CMD, the final device 103 removes the default identification code FF of the final device 103 according to the identification code removing command CMD in the received addressing command packet. The final device 103 sets the individual device identification address in the received addressing command packet (or the individual device identification address that is counted up by the device 102 as described above) as the unique identification code ID (3) of the final device 103. At this time, resetting of the unique identification code ID (3) of the final device 103 is completed.

Reference is made to FIGS. 1 to 8, in which FIG. 8 is a schematic diagram of a plurality of bit values of an addressing command packet transmitted between the plurality of devices of the single-wire multi-device cascade addressing system according to the embodiment of the present disclosure.

The addressing command packet received by each of the plurality of devices 101 to 103 as shown in FIG. 7 may have N bit values such as, but not limited to bit values of bits b0 to b19 as shown in FIG. 8, wherein N is an appropriate integer value. Among the N bit values of the addressing command packet received by each of the plurality of devices 101 to 103, M bit values represent the individual device identification address used for setting each of the plurality of devices 101 to 103, wherein M is an appropriate integer value.

The first device 101 may set the unique identification code ID(1) of the first device 101 according to the M bit values among the N bit values of the addressing command packet from the controller 900. In addition, the first device 101 adjusts the M bit values among the N bit values of the addressing command packet from the controller 900, and outputs the addressing command packet having the adjusted M bit values to the device 102 that is arranged next to the first device 101.

For example, the first device 101 sets the individual device identification address (such as a bit value of "01" as shown in FIG. 8) in the addressing command packet from the controller 900 as the unique identification code ID(1) of the first device 101. In addition, the first device 101 may count up the individual device identification address (such as the bit value of "01") in the addressing command packet from the controller 900 once to form the increased individual device identification address (such as a bit value of "10"). The first device 101 outputs the increased individual device identification address (such as the bit value of "10") to the device 102 that is arranged next to the first device 101.

Alternatively, the first device 101 may count up the individual device identification address (such as a bit value of "00") in the addressing command packet from the controller 900 to increase the individual device identification address once. The first device 101 may set the increased individual device identification address (such as a bit value of "01") as the unique identification code ID(1) of the first device 101. Further, the first device 101 may count up the unique identification code ID(1) of the first device 101 (such as a bit value of "01") to increase the unique identification code ID(1), and may output the addressing command packet having the individual device identification address that is the same as the increased unique identification code ID(1) (such as a bit value of "10") to the device 102 that is arranged next to the first device 101.

The device 102 that is the second one of the plurality of devices 101 to 103 sets the unique identification code ID(2) of the device 102 according to the M bit values among the N bit values in the addressing command packet from the first device 101. In addition, the device 102 adjusts the M bit values among the N bit values in the addressing command packet from the first device 101, and outputs the addressing command packet having the adjusted M bit values to the final device 103 that is arranged next to the device 102.

For example, the device 102 sets the individual device identification address (such as the bit value of "10") in the addressing command packet from the first device 101 as the unique identification code ID(2) of the device 102. In addition, the device 102 counts up the individual device identification address in the addressing command packet from the first device 101 to increase the individual device identification address once. The device 102 outputs the addressing command packet having the increased individual device identification address (such as a bit value of "11") to the final device 103 that is arranged next to the device 102.

The final device 103 that is a third one of the plurality of devices 101 to 103 sets the unique identification code ID(3) of the final device 103 according to the M bit values among the N bit values in the addressing command packet from the device 102 that is the second one of the plurality of devices 101 to 103. For example, the final device 103 sets the individual device identification address in the addressing command packet from the device 102 (such as a bit value of "11") as the unique identification code ID(3) of the final device 103.

The final device 103 may adjust the M bit values among the N bit values in the addressing command packet from the device 102, and may output the addressing command packet having the adjusted M bit values to the controller 900. Alternatively, the final device 103 may not adjust the M bit values among the N bit values in the addressing command packet from the device 102, and may directly transmit the addressing command packet from the device 102 to the controller 900.

The controller 900 compares the bit values of the individual device identification address of the addressing command packet that is outputted to the first device 101 from the controller 900 with the bit values of the individual device identification address of the addressing command packet that is received from the final device 103 by the controller 900, to determine the individual device identification addresses respectively received by the plurality of devices 101 to 103 and to determine the arrangement sequence and the number of the plurality of devices 101 to 103. At this time, addressing of the plurality of devices 101 to 103 is completed.

After the above-mentioned operations are performed, the controller 900 may output a control command packet having a plurality of bit values that represent the unique identification code ID, operational control information and control commands that are used for the plurality of devices 101 to 103 to the first device 101. The control command packet is sequentially transmitted from the first device 101 to the final device 103. Each of the plurality of devices 101 to 103 may identify the bit values in the received control command packet to determine which parts of the operational control information and which one of the control commands in the received control command packet are used for itself, and operates according to the parts of the operational control information and the one of the control commands.

Figure 9:
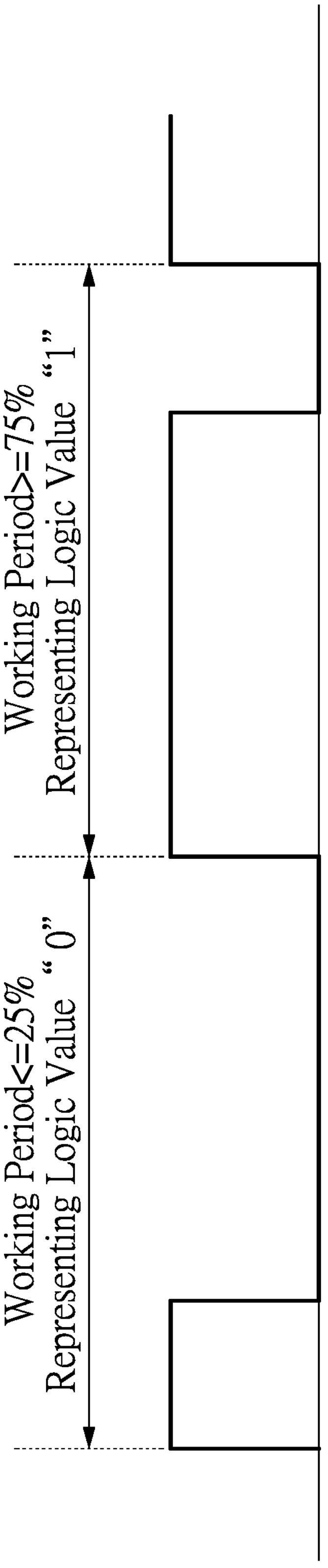
FIG. 9 is a schematic diagram of a pulse width modulation signal having working periods representing an individual device identification address in an addressing command packet transmitted between the plurality of devices of the single-wire multi-device cascade addressing system according to the embodiment of the present disclosure.

Reference is made to FIGS. 1 to 9, in which FIG. 9 is a schematic diagram of a pulse width modulation signal having working periods representing an individual device identification address in an addressing command packet transmitted between the plurality of devices of the single-wire multi-device cascade addressing system according to the embodiment of the present disclosure.

The addressing command packet received by each of the plurality of devices 101 to 103 as described above may have the pulse width modulation signal. The pulse width modulation signal has a plurality of waveforms. Working periods of at least some of the plurality of waveforms of the pulse width modulation signal respectively represent the M bit values of the individual device identification address.

Working periods of some of the plurality of waveforms of the pulse width modulation signal in the addressing command packet received by each of the plurality of devices 101 to 103 may respectively represent the P bit values of the identification code removing command CMD.

For example, the bit value of "0" is represented by the working period of one of the plurality of waveforms of the pulse width modulation signal that is not larger than a first working period (such as, but not limited to 25%), and the bit value of "1" is represented by the working period of one of the plurality of waveforms of the pulse width modulation signal that is not smaller than a second working period (such as, but not limited to 75%).

Alternatively, the bit value of "0" is represented by the working period of one of the plurality of waveforms of the pulse width modulation signal that is equal to the first working period, and the bit value of "1" is represented by the working period of one of the plurality of waveforms of the pulse width modulation signal that is equal to the second working period.

Alternatively, the bit value of "0" is represented by the working period of one of the plurality of waveforms of the pulse width modulation signal that falls within a first working period range, and the bit value of "1" is represented by the working period of one of the plurality of waveforms of the pulse width modulation signal that falls within a second working period range.

In conclusion, the present disclosure provides the single-wire multi-device cascade addressing system. Only one original data transmission wire, instead of a plurality of clock signal transmission wires, is disposed between the plurality of devices and the controller, thereby saving circuit costs. Under this condition, each of the plurality of devices of the single-wire multi-device cascade addressing system of the present disclosure is still able to be efficiently addressed. After the plurality of devices are addressed, the controller of the single-wire multi-device cascade addressing system of the present disclosure is able to transmit the control command packet for issuing the commands respectively for the plurality of devices, and the plurality of devices operate respectively according to the commands.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A single-wire multi-device cascade addressing system, comprising:

a controller; and a plurality of light-emitting devices arranged sequentially, wherein a first one of the plurality of light-emitting devices is defined as a first device, a last one of the plurality of light-emitting devices is defined as a final device, an input terminal of the first device is connected to an output terminal of the controller, an input terminal of each of the plurality of light-emitting devices except for the first device is connected to an output terminal of a previous one of the plurality of light-emitting devices, and an output terminal of the final device is connected to an input terminal of the controller;

wherein the input terminal of the first device is configured to receive an addressing command packet from the output terminal of the controller, the first device is configured to count up an individual device identification address that is represented by two bit values among N bit values included in the addressing command packet from the controller once, the first device is configured to set the individual device identification address that is counted up once as a unique identification code of the first device, and the first device is configured to output the addressing command packet that is counted up once to one of the plurality of light-emitting devices that is arranged next to the first device, wherein the N of the N bit values is an integer value that is not smaller than 2;

wherein the input terminal of each of the plurality of light-emitting devices except for the first device is configured to receive the addressing command packet from the output terminal of a previous one of the plurality of light-emitting devices, and each of the plurality of light-emitting devices except for the first device is configured to set the individual device identification address that is represented by the two bit values among the N bit values included in the addressing command packet from the previous one of the plurality of light-emitting devices as a unique identification code thereof;

wherein each of the plurality of light-emitting devices except for the first device and the final device is configured to count up the individual device identification address that is represented by the two bits among the N bit values included in the addressing command packet from the previous one of the plurality of light-emitting devices, and configured to output the addressing command packet that is counted up by itself to a next one of the plurality of light-emitting devices;

wherein the final device is configured to directly transmit the addressing command packet from the previous one of the plurality of light-emitting devices to the controller, or is configured to count up the addressing command packet from the previous one of the plurality of devices and output the addressing command packet that is counted up by itself to the controller;

wherein the addressing command packet received by each of the plurality of light-emitting devices includes a pulse width modulation signal, the pulse width modulation signal includes a plurality of waveforms, the two bit values of the individual device identification address are respectively represented by two working periods of two continuous ones of a plurality of working periods of the plurality of waveforms of the pulse width modulation signal, and each of the two bit values of the individual device identification address is 0 or 1;

wherein the working period of the pulse width modulation signal that represents the bit value “0” of the individual device identification address is not larger than a first working period and is not a zero value;

wherein the working period of the pulse width modulation signal that represents the bit value “1” of the individual device identification address is not smaller than a second working period and is not the zero value;

wherein the two continuous ones of the plurality of working periods of the pulse width modulation signal received by at least one of the plurality of light-emitting devices are different from each other;

wherein each of the plurality of light-emitting devices, is configured to, before receiving the addressing command packet, have a default identification code as the unique identification code;

wherein, each of the plurality of light-emitting devices is configured to receive the addressing command packet including an identification code removing command, and remove the default identification code according to the identification code removing command.

2. The single-wire multi-device cascade addressing system according to claim 1, wherein the controller is configured to compare the addressing command packet that is outputted to the first device from the controller with the addressing command packet that is received from the final device by the controller to determine the individual device identification addresses respectively received by the plurality of light-emitting devices and to determine an arrangement sequence and a number of the plurality of light-emitting devices.

3. The single-wire multi-device cascade addressing system according to claim 1, wherein the output terminal of each of the plurality of light-emitting devices that is not outputting the addressing command packet to the next one of the plurality of light-emitting devices or the controller is in an off-state.

4. The single-wire multi-device cascade addressing system according to claim 3, wherein, after each of the plurality of light-emitting devices except for the final device is configured to count up the individual device identification address of the addressing command packet from the previous one of the plurality of light-emitting devices, the output terminal of each of the plurality of light-emitting devices except for the final device is switched from the off-state to an on-state and is configured to output the addressing command packet that is counted up by itself to the input terminal of the next one of the plurality of light-emitting devices.

5. The single-wire multi-device cascade addressing system according to claim 4, wherein, after the final device is configured to count up the individual device identification address of the addressing command packet, the output terminal of the final device is switched from the off-state to the on-state and is configured to output the addressing command packet that is counted up by itself to the input terminal of the controller;

wherein the output terminals of the plurality of light-emitting devices are sequentially switched from the off-state to the on-state, and an order of switching the output terminals of the plurality of light-emitting devices from the off-state to the on-state depends on an arrangement sequence of the plurality of light-emitting devices.

6. The single-wire multi-device cascade addressing system according to claim 1, wherein, when each of the plurality of light-emitting devices is configured to count up the individual device identification address in the addressing command packet from the previous one of the plurality of light-emitting devices once, the individual device identification address is increased once, and each of the plurality of light-emitting devices is configured to set the individual device identification address that is increased as the unique identification code thereof.

7. The single-wire multi-device cascade addressing system according to claim 1, wherein P bit values among the N bit values of the addressing command packet represent the identification code removing command for each of the plurality of light-emitting devices, wherein P is an integer value.

8. The single-wire multi-device cascade addressing system according to claim 7, wherein working periods of some of the plurality of waveforms of the pulse width modulation signal represent the P bit values of the individual device identification address, each of the P bit values is a bit value "0" or "1".

9. The single-wire multi-device cascade addressing system according to claim 1, wherein each of the plurality of light-emitting devices includes one or more light-emitting components.

* * * * *